United States Patent
Zhu et al.

(10) Patent No.: US 8,178,230 B2
(45) Date of Patent: May 15, 2012

(54) BATTERY PACK

(75) Inventors: Jianhua Zhu, Shenzhen (CN); Weixin Zheng, Shenzhen (CN); Hao Hu, Shenzhen (CN); Xi Shen, Shenzhen (CN)

(73) Assignee: BYD Co., Ltd., Shenzhen (CN)

( * ) Notice: Subject to any disclaimer, the term of this patent is extended or adjusted under 35 U.S.C. 154(b) by 737 days.

(21) Appl. No.: 12/337,239

(22) Filed: Dec. 17, 2008

(65) Prior Publication Data
US 2009/0155679 A1    Jun. 18, 2009

(30) Foreign Application Priority Data
Dec. 18, 2007    (CN) .................... 2007 2 0310176 U

(51) Int. Cl.
*H01M 2/10*    (2006.01)
(52) U.S. Cl. .......................................... 429/99; 429/159
(58) Field of Classification Search ............. 429/87, 429/88, 99, 100, 159
See application file for complete search history.

(56) References Cited

U.S. PATENT DOCUMENTS

| | | | | |
|---|---|---|---|---|
| 5,977,746 | A * | 11/1999 | Hershberger et al. ....... | 429/99 X |
| 6,377,432 | B1 | 4/2002 | Hashimoto | |
| 7,547,487 | B1 * | 6/2009 | Smith et al. ................. | 429/99 X |
| 7,951,477 | B2 * | 5/2011 | Wood et al. .................... | 429/99 |
| 2002/0146620 | A1 | 10/2002 | Connell | |
| 2003/0134189 | A1 | 7/2003 | Kanai et al. | |
| 2004/0033415 | A1 | 2/2004 | Chen et al. | |
| 2005/0214634 | A1 | 9/2005 | Kim | |
| 2005/0238930 | A1 | 10/2005 | Yoshida et al. | |
| 2005/0277019 | A1 | 12/2005 | Riley, Jr. et al. | |
| 2006/0110657 | A1 | 5/2006 | Stanton et al. | |

FOREIGN PATENT DOCUMENTS

| | | |
|---|---|---|
| CN | 1185664 A | 6/1998 |
| CN | 1241305 A | 1/2000 |
| CN | 2433734 Y | 6/2001 |
| CN | 1319901 A | 10/2001 |
| CN | 97117532.2 | 7/2002 |
| CN | 1442927 A | 9/2003 |
| CN | 97120801.8 | 12/2003 |
| CN | 200420026421.3 | 4/2004 |

(Continued)

OTHER PUBLICATIONS

European Search Report, EP08400057, dated Mar. 29, 2010, 6 pgs.

*Primary Examiner* — Stephen J. Kalafut
(74) *Attorney, Agent, or Firm* — Brinks Hofer Gilson & Lione

(57) ABSTRACT

A battery pack comprises a plurality of electrochemical cells and a housing. The cells have similar shape and size. The shape is a rectangular prism with opposing major faces. The cells are aligned in a stack along an axis of the pack so that one of the major faces of each cell contacts the major face of the adjacent cell. The housing comprises a top portion and a bottom portion. The top portion comprises a top plate and four side plates joined to the top plate so as to form a cavity with an opening. The cross-sectional area of the opening is at least slightly larger than the cross-sectional area of the stack, and the cross-sectional area of the cavity in a plane closer to the top plate is sized so that the stack fits snugly therein. The battery stack is disposed in the housing. The bottom portion closes the opening.

20 Claims, 4 Drawing Sheets

FOREIGN PATENT DOCUMENTS

| | | |
|---|---|---|
| CN | 1497753 A | 5/2004 |
| CN | 200420034061.1 | 6/2004 |
| CN | 1540792 A | 10/2004 |
| CN | 2679860 Y | 2/2005 |
| CN | 1604357 A | 4/2005 |
| CN | 1610168 | 4/2005 |
| CN | 200520071106.7 | 4/2005 |
| CN | 2704119 Y | 6/2005 |
| CN | 2717037 | 8/2005 |
| CN | 2717038 Y | 8/2005 |
| CN | 1716658 A | 1/2006 |
| CN | 1738096 A | 2/2006 |
| CN | 1750295 | 3/2006 |
| CN | 03103954.5 | 3/2006 |
| CN | 1773747 A | 5/2006 |
| CN | 1783576 A | 6/2006 |
| CN | 1841820 A | 10/2006 |
| CN | 1841831 A | 10/2006 |
| CN | 1841834 A | 10/2006 |
| CN | 1855608 A | 11/2006 |
| CN | 2849999 Y | 12/2006 |
| CN | 1941458 A | 4/2007 |
| CN | 1949580 A | 4/2007 |
| CN | 1976095 Y | 6/2007 |
| CN | 101088192 A | 12/2007 |
| CN | 200993972 Y | 12/2007 |
| CN | 200510092257.5 | 2/2008 |
| EP | 1780819 A1 | 5/2007 |
| EP | 2 141 756 A1 | 1/2010 |
| JP | 5-21086 | 1/1993 |
| JP | 7-169452 A | 7/1995 |
| JP | 11067278 | 3/1999 |
| JP | 11-204130 A | 7/1999 |
| JP | 11-312512 A | 9/1999 |
| JP | 2001085042 A | 3/2001 |
| JP | 2001-126683 | 5/2001 |
| JP | 2001-283940 A | 10/2001 |
| JP | 2001338628 A | 12/2001 |
| JP | 2002-260745 A | 9/2002 |
| JP | 2002-329530 | 11/2002 |
| JP | 2006-173095 | 11/2002 |
| JP | 2003 168405 A | 6/2003 |
| JP | 2003288882 A | 10/2003 |
| JP | 2004-253262 | 9/2004 |
| JP | 2004-327311 | 11/2004 |
| JP | 2005-71640 A | 3/2005 |
| JP | 2005-190885 | 7/2005 |
| JP | 2005-251617 | 9/2005 |
| JP | 2006-79960 A | 3/2006 |
| JP | 2006-294531 A | 10/2006 |
| JP | 2007-194035 A | 8/2007 |
| JP | 2008-123800 | 5/2008 |
| JP | 2008-181765 | 8/2008 |
| JP | 2008-181822 | 8/2008 |
| WO | WO 2006/030659 A1 | 3/2006 |
| WO | WO 2008/144994 A1 | 12/2008 |

* cited by examiner

BATTERY PACK

The present application claims priority to Chinese Patent Application No. 200720310176.2, filed Dec. 18, 2007, the entirety of which is hereby incorporated by reference.

FIELD OF THE DISCLOSURE

The present disclosure relates to a battery pack comprising a housing.

BACKGROUND OF THE DISCLOSURE

With the rapid development of the automobile industry, the number of the fuel vehicles is growing. Although the standards of automobile emissions have been made, the pollution caused by the emissions can not be prevented completely.

At present, batteries, especially high power batteries, are playing a very important role in the hybrid vehicles (HEV), pure electric vehicles (EV) and other electric devices. As people have growing requirements for the environment, hybrid vehicles (HEV) and pure electric vehicles (EV) will be the future developing direction. Hybrid vehicles (HEV) and pure electric vehicles (EV) usually employ a battery pack as a power supply to drive the motor. The design of a battery pack should meet many requirements. For example, the basic battery performance should meet the requirements for driving a vehicle. Furthermore, the housing of the battery assembly should have a structure compatible with the vehicle.

As FIG. 1 shows, CN2679860Y disclosed a rectangular lithium ion battery pack. The battery pack comprises a battery body (1) and a battery fastening device (2). The battery body (1) comprises a multi-cell assembly. Each cell comprises a positive and a negative terminal. The positive and negative terminals of the cells are connected in series. The battery fastening device (2) comprises two pressing plates (3) and a plurality of connecting strips (4). The two pressing plates (3) are placed in the two ends of the battery body (1), respectively. The two pressing plates press the battery body (1). The connecting strips (4) are connected to the two pressing plates (3) and fasten the battery body (1).

SUMMARY OF THE DISCLOSURE

A battery pack comprises a plurality of electrochemical cells and a housing. The cells have similar shape and size. The shape is a rectangular prism with opposing major faces. The cells are aligned in a stack along an axis of the pack so that one of the major faces of each cell contacts the major face of the adjacent cell. The housing comprises a top portion and a bottom portion. The top portion comprises a top plate and four side plates joined to the top plate so as to form a cavity with an opening. The cross-sectional area of the opening is at least slightly larger than the cross-sectional area of the stack, and the cross-sectional area of the cavity in a plane closer to the top plate is sized so that the stack fits snugly therein. The stack is disposed in the housing. The bottom portion closes the opening.

DETAILED DESCRIPTION OF THE DISCLOSURE

Figure 1:
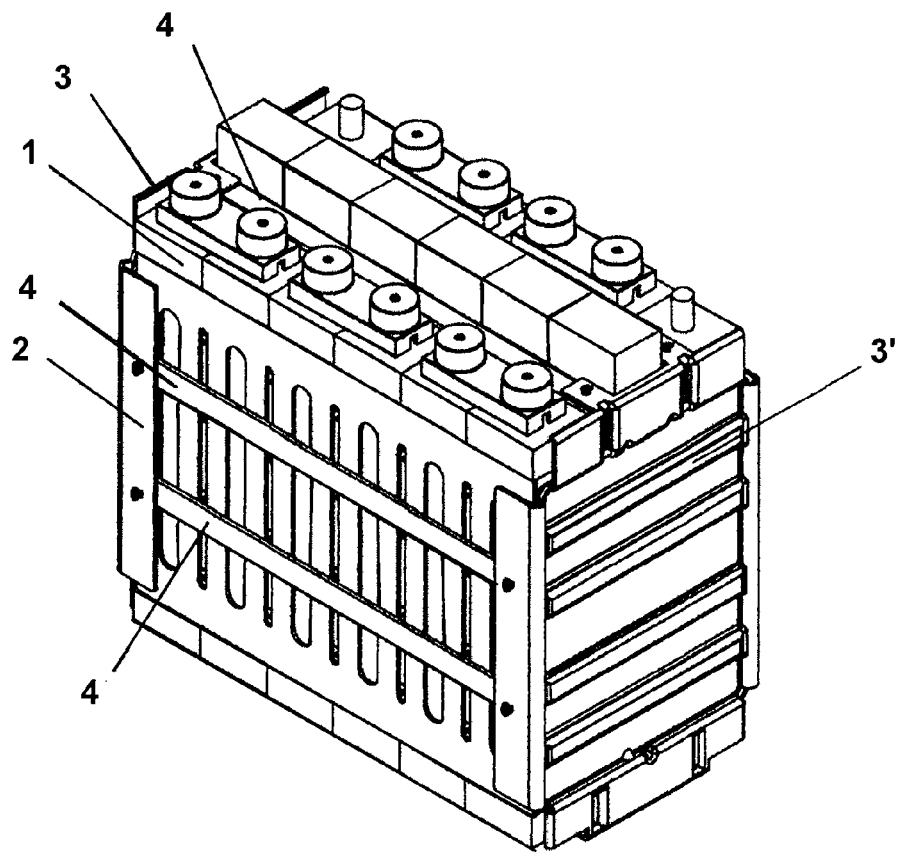
FIG. 1 is a perspective view of the battery pack in the prior art.
Figure 2:
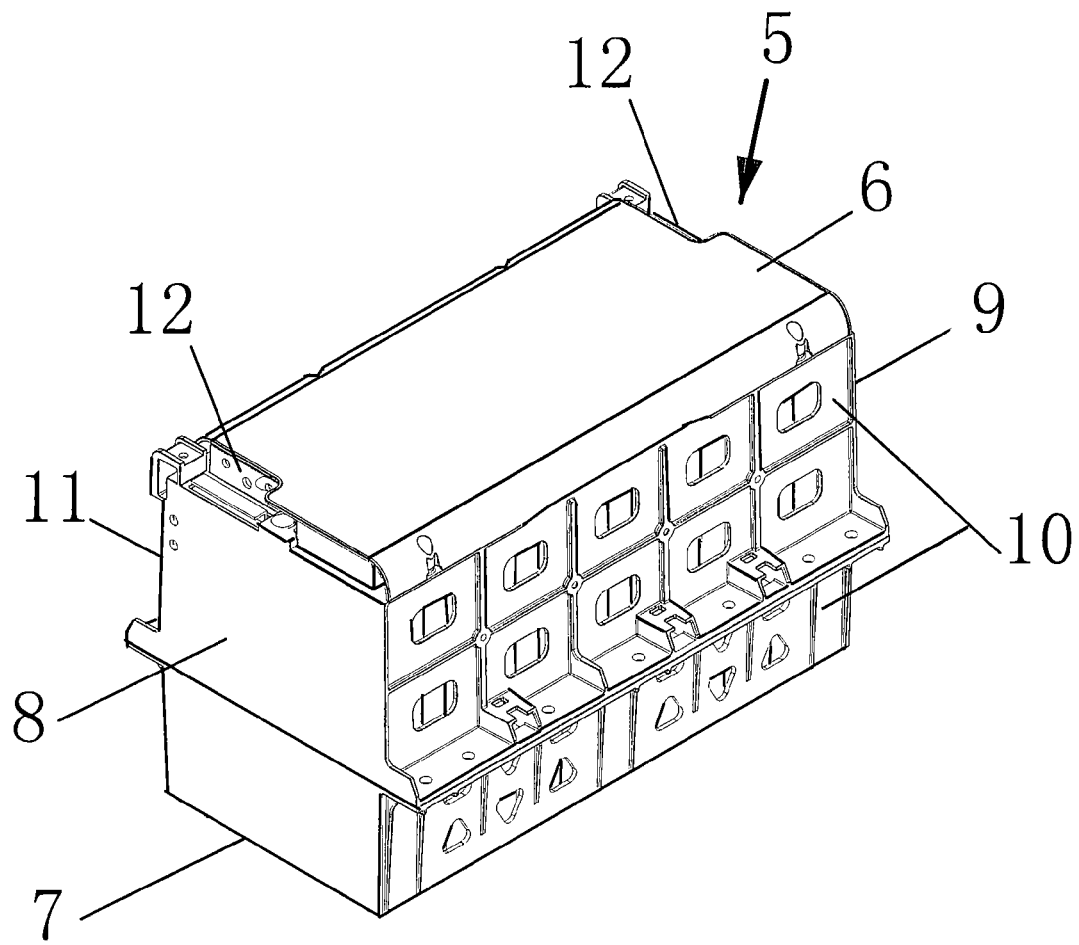
FIG. 2 is a perspective view of the battery pack according to one embodiment of the invention.
Figure 3:
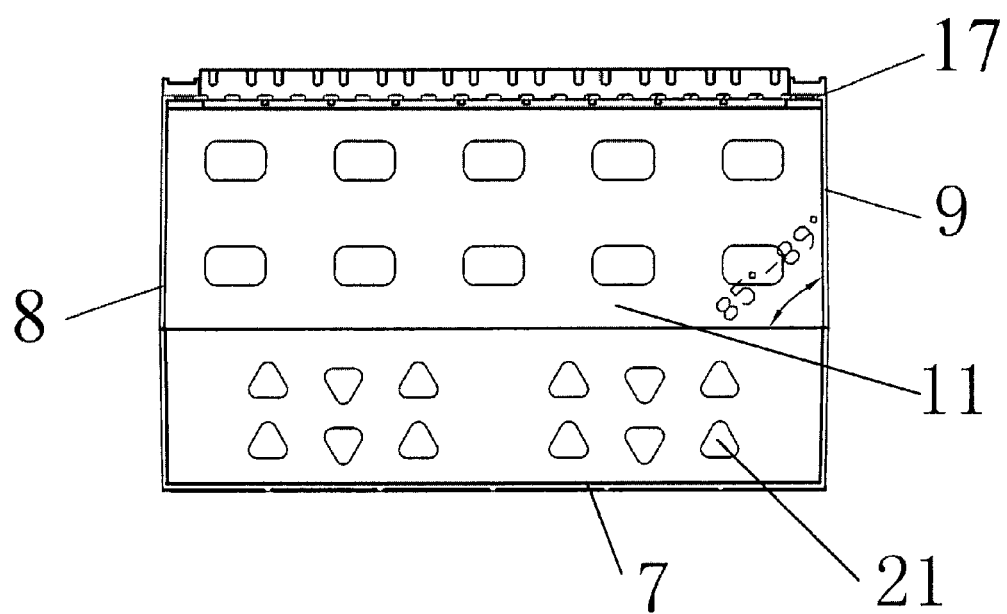
FIG. 3 is the side view of the battery housing according to one embodiment of the invention.
Figure 4:
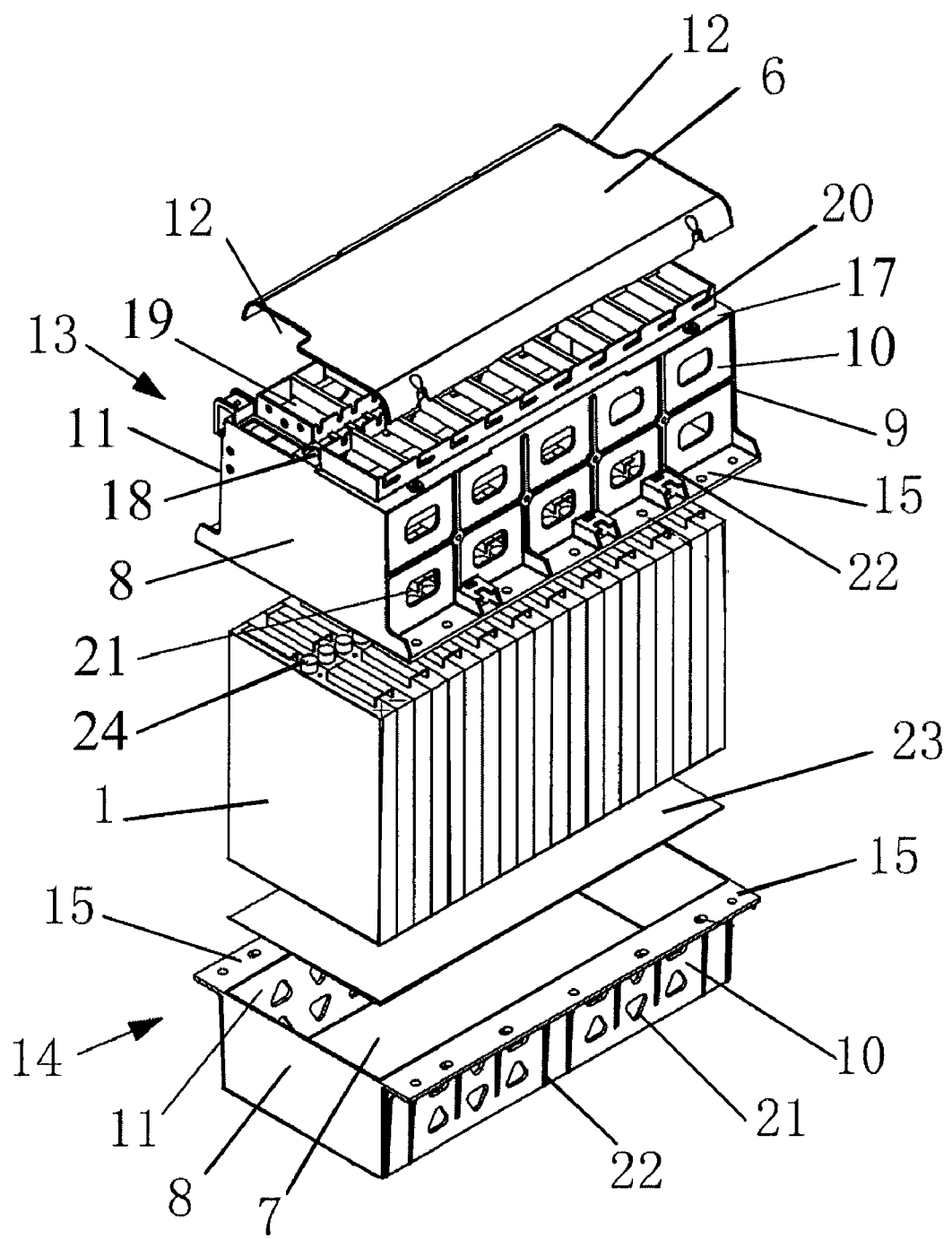
FIG. 4 is an exploded view of the battery pack according to one embodiment of the invention.

As shown in FIG. 2 to FIG. 4, the battery pack comprises a plurality of electrochemical cells and a housing (5). The cells have similar shape and size. The shape is a rectangular prism with opposing major faces. The cells are aligned in a stack (1) along an axis of the pack so that one of the major faces of each cell contacts the major face of the adjacent cell. The cells can be connected in series. The housing comprises a top portion (13) and a bottom portion (14). The top portion comprises a top plate (6) and four side plates (8, 9, 10, 11) joined to the top plate (6) so as to form a cavity with an opening. The stack (1) is disposed in the housing (5). The bottom portion (14) closes the opening.

As FIG. 2 to FIG. 4 show, the shell 5 for the battery pack in the present utility with the clamping force is the case shell enclosed by the cover board 6, bottom board 7, left side board 8, right side board 9, front board 10 and the back board 11, the derivation grooves 12 are set according to the position and match the size of the positive and negative terminals of the battery body 1 on the said cover board 6, wherein, the whole board surface of the said left side board 8 and/or right side board 9 or at least the upside portion is lean to the inner side of the case and formed an angle of 85°-89° with the bottom board 7. Preferably, said the whole board surface of the said left side board 8 and/or right side board 9 or at least the upside portion is lean to the inner side of the case and formed an angle of 87°-89° with the bottom board 7.

The cross-sectional area of the opening is at least slightly larger than the cross-sectional area of the stack. With the opening being slightly larger than the stack, the insertion of the cells into the housing is facilitated. By insertion, it is meant to cover either placing all of the cells in the stack into the housing at the same time; placing of the cells one by one in the housing; or placing the housing over the cells. The cross-sectional area of the cavity in a plane closer to the top plate is sized so that the stack fits snugly therein. The cavity may be tapered so that the cross-sectional area at the top of the housing is the smallest. Alternatively, the cross-sectional area at some point between the opening and the top is reduced. As a result, the cells are held together tightly by this part of the housing.

Preferably, the cavity is longer along the axis at the opening and shorter at the plane closer to the top plate, to thereby press the cells against one another.

In one embodiment shown in FIG. 2, the bottom portion (14) comprises a bottom portion cavity housing a bottom portion of the cells. Extension edges (15) are installed on the top portion (13) and the bottom portion (14). The top portion (13) and the bottom portion (14) are assembled by connecting the extension edges (15) of the top portion (13) to the extension edges of the bottom portion (14). Preferably, the cavity may be tapered so that the cross-sectional area at the opening is the smaller than the cross-sectional area at the bottom. Alternatively, the cross-sectional area at some point between the opening and the bottom is reduced. Alternatively, the bottom portion can be a generally planar plate.

The top plate (5) comprises grooves (12). The positive and negative terminals of the battery protrude from the housing via the grooves (12). To ensure the heat-dissipation efficiency and the light weight of the battery pack, the side plates (8, 9, 10, 11) comprises a plurality of holes (21). The holes (21) can be any suitable shape, such as round, square, ellipse, triangle and other shapes. Furthermore, a plurality of strips (22) are installed on the side plates (8, 9, 10, 11) to strengthen the mechanic property of the housing (5).

A protective plate (17) is installed between the top plate (5) and the battery stack (1). The protective plate (17) is connected fixedly to the at least one of the top plate (5) and the side plates (8, 9, 10, 11). The protective plate (17) comprises a plurality of openings (18) and a plurality of grooves (19). The battery cells comprise safety valves (24), positive and negative terminals. The openings (18) are adapted to the cell safety valves (24). The grooves (19) are adapted to the positive and negative terminals of the cell. The openings (18) and grooves (19) may help fasten the battery body. Furthermore, the grooves (19) may protect the positive and negative terminals of the battery cells, and prevent them from the external impact and its effect on the battery performance.

The groove (19) has a side wall extending from the protective plate (17). Slots (20) are installed on the side wall. To measure the electrical voltage and the temperature of the cells, some wires can be placed in the slots (20).

The housing can be made of plastic materials with high strength, high tenacity, nonflammability, high impact resistance and other properties. For example, the materials can be a glass fiber-reinforced polyphenylsulfide (PPS), a glass fiber-reinforced polyamide (PA66), a polyethylenimine (PEI), a polyetheretherketone (PEEK), and other plastic materials. Preferably, a glass fiber-reinforced polyamide (PA66) is selected.

The battery pack further comprises a cushion (23), disposed between the battery stack (1) and the bottom plate (7). The cushion can be made of a rubber material. The cushion further protects the battery stack.

Many modifications and other embodiments of the present disclosure will come to mind to one skilled in the art to which the present disclosure pertains having the benefit of the teachings presented in the foregoing description; and it will be apparent to those skilled in the art that variations and modifications of the present disclosure can be made without departing from the scope or spirit of the present disclosure. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A battery pack comprising:
a plurality of electrochemical cells of similar shape and size, the shape being a rectangular prism with opposing major faces, the cells being aligned in a stack along an axis of the pack so that one of the major faces of each cell contacts the major face of the adjacent cell; and
a housing comprising:
a top portion comprising a top plate and four side plates joined to the top plate so as to form a cavity with an opening, wherein the cross-sectional area of the opening is larger than the cross-sectional area of the stack; and
a bottom portion for closing the opening;
wherein the stack is disposed in the housing and received in the cavity, the cavity being tapered from the opening to the top plate such that the stack fits snugly in the cavity.

2. The battery pack of claim 1, wherein the bottom portion is a generally planar plate.

3. The battery pack of claim 1, wherein the bottom portion comprises a bottom portion cavity housing a bottom portion of the cells, and the cavity has an opening.

4. The battery pack of claim 3, wherein the cross-sectional area of the opening is smaller than the cross-sectional area of the bottom.

5. The battery pack of claim 3, wherein the top portion and the bottom portion comprise extension edges; and wherein the top portion and the bottom portion are assembled by connecting the extension edges of the top portion to the extension edges of the bottom portion.

6. The battery pack of claim 1, wherein the housing comprises a plastic material.

7. The battery pack of claim 6, wherein the plastic material is selected from the group consisting of a glass fiber-reinforced polyphenylsulfide (PPS), a glass fiber-reinforced polyamide (PA66), a polyethylenimine (PEI), a polyetheretherketone (PEEK), and combinations thereof.

8. The battery pack of claim 1, wherein at least one of the side plates comprises a hole.

9. The battery pack of claim 1, wherein the top plate comprises a groove, adapted to the stack.

10. The battery pack of claim 1, wherein the housing further comprises a strip, placed on the at least one of the side plates.

11. The battery pack of claim 1, wherein the housing further comprises a protective plate, disposed between the top plate and the stack.

12. The battery pack of claim 11, wherein the protective plate is connected to the at least one of the top plate and the side plates.

13. The battery pack of claim 12, wherein the at least one of the cells comprises a safety valve.

14. The battery pack of claim 13, wherein each cell comprises a positive and negative terminal.

15. The battery pack of claim 13, wherein the protective plate comprises an opening, adapted to the safety valve.

16. The battery pack of claim 13, wherein the protective plate comprises a groove, and the positive and negative terminals protrude through the groove.

17. The battery pack of claim 16, wherein the groove comprises a side wall extending from the protective plate, and the side wall comprises a slot.

18. The battery pack of claim 1, wherein the housing further comprises a cushion, disposed between the stack and the bottom portion.

19. A battery pack comprising:
a plurality of electrochemical cells of similar shape and size, the shape being a rectangular prism with opposing major faces, the cells being aligned in a stack along an axis of the pack so that one of the major faces of each cell contacts the major face of the adjacent cell; and
a housing comprising:
a top portion comprising a top plate and four side plates joined to the top plate so as to form a cavity with an opening, wherein the cross-sectional area of the opening is larger than the cross-sectional area of the stack; and
a bottom portion for closing the opening;
wherein the stack is disposed in the housing and received in the cavity, the cavity being tapered from the opening to the top plate such that the stack fits snugly in the cavity.
wherein the cavity is longer along the axis at the opening and shorter at the plane adjacent to the top plate, to thereby press the cells against one another.

20. The battery pack of claim 2, wherein at least one of the side plates forms an angle of from about 85° to about 89° with the bottom plate.

* * * * *